J. W. MONMONIER & J. H. MOREHEAD.
SELF WEIGHING SCOOP.
APPLICATION FILED OCT. 12, 1911.
1,034,486.
Patented Aug. 6, 1912.
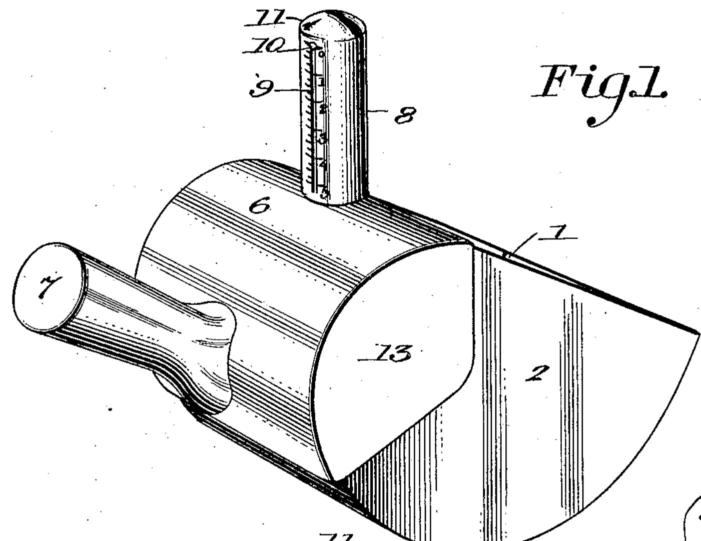
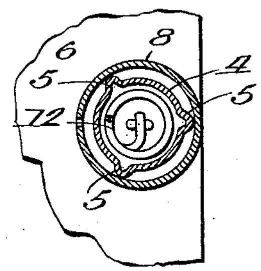
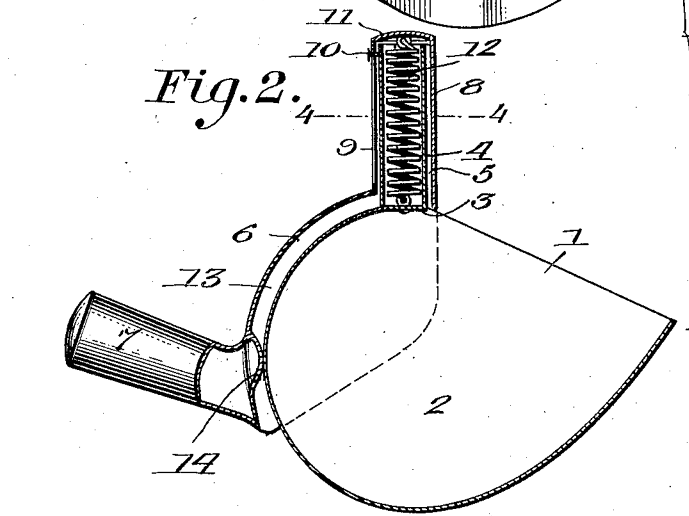
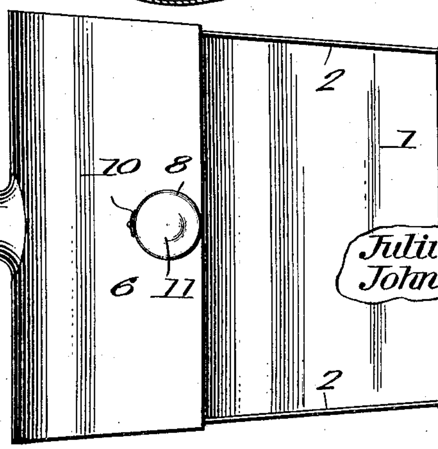
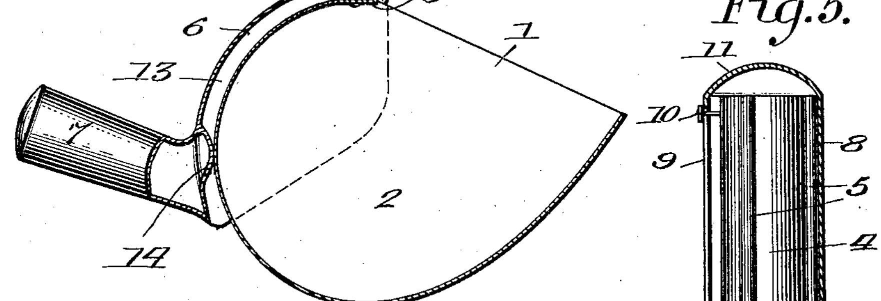
WITNESSES
Philip E. Barnes
Rea Albright
Julius W. Monmonier
John H. Morehead
INVENTORS
E. B. Stocking
Attorney
COLUMBIA PLANOGRAPH CO., WASHINGTON, D. C.

UNITED STATES PATENT OFFICE.

JULIUS W. MONMONIER AND JOHN HOE MOREHEAD, OF GLOBE, ARIZONA.

SELF-WEIGHING SCOOP.

1,034,486. Specification of Letters Patent. Patented Aug. 6, 1912.

Application filed October 12, 1911. Serial No. 645,211.

*To all whom it may concern:*

Be it known that we, JULIUS W. MONMONIER and JOHN HOE MOREHEAD, citizens of the United States, residing at Globe, county of Gila, State of Arizona, have invented certain new and useful Improvements in Self-Weighing Scoops, of which the following is a specification, reference being had therein to the accompanying drawing.

This invention relates to certain new and useful improvements in self weighing scoops, the object being to provide a scoop which is exceedingly simple and cheap in construction and one in which the material in the scoop will be automatically weighed, thereby enabling the person to scoop from a bin the material and weigh the same without the use of scales.

Another object of the invention is to improve the general construction of scoops of this character whereby the scoop proper and handle are so connected together that an exceedingly strong and durable scoop is formed and one in which friction between the respective members is greatly reduced in order to prevent the weighing spring from being affected by the frictional contact between the members.

A further object of the invention is to provide a scoop which is mounted within the guide portion of the handle in such a manner that the scoop is guided in its vertical movement and at the same time retained within the guide portion of the handle in such a manner as to prevent longitudinal movement in either direction, thereby relieving the telescoping sections of the scale of any strain when forcing the scoop into the material or drawing the same therefrom.

Other and further objects and advantages of the invention will be hereinafter set forth and the novel features thereof defined by the appended claims.

In the drawing—Figure 1 is a perspective view of our improved self weighing scoop; Fig. 2 is a longitudinal vertical section through the scoop; Fig. 3 is a top plan view; Fig. 4 is a section taken on line 4—4 of Fig. 2; and Fig. 5 is an enlarged vertical section through the outer telescoping tubular portion of the scale showing the inner section in elevation.

Like numerals of reference refer to like parts in the several figures of the drawings.

In the drawing, 1 indicates the scoop proper or bowl which is provided with straight sides as shown at 2 and is preferably formed with a curved bottom and end which terminates in a top portion 3 having a tubular member 4 extending upwardly therefrom which is provided with spaced vertical beads 5 for spacing and guiding the same in its vertical movement as will be later described.

The rear portion of the scoop proper or bowl 1 is arranged within a guide portion 6 having a handle 7 adapted to be grasped for manipulating the same and said guide portion conforms in shape to the rear portion of the scoop and comprises a back portion having an upwardly projecting tubular member 8 into which the tubular member 4 of the scoop is adapted to telescope and the tubular member 8 is provided with a vertical slot 9 having graduations marked thereon to designate pounds and fractions thereof. Extending through the slot 9 is a pointer 10 carried by the tubular member 4 for indicating the number of pounds of material within the scoop as will be later described. The tubular portion 8 is provided with a cap 11 to which is connected the upper end of a retractile spiral spring 12 which fits snugly within the tubular portion 4 and is connected to the top portion 3 of the scoop 1. From this construction, it will be seen that when the scoop is forced into the body of material and raised by the handle 7, the tubular portions will slide within one another, allowing the weighing spring to act in order to designate the weight of the material within the scoop, it, of course, being understood that the weight of the scoop is compensated for by the setting of the pointer.

The scoop proper is formed wedge shaped as clearly shown in Fig. 3 and the guide portion 6 of the handle 7 is provided with converging sides 13 conforming to the inclination of the side walls of the scoop or bowl 1 which prevents any longitudinal movement of the bowl within the guide portion of the handle and at the same time allows the scoop a free vertical movement. The beads 5 upon the tubular portion 4 hold the telescoping tubular portions slightly spaced apart in order to reduce the friction between the same when one is moved in respect to the other.

In order to prevent any strain from being brought to bear upon the telescoping tubular members of the scale in order to force the scoop into the body of material, we provide the guide portions 6 of the handle 7 with a transverse bead 14 which engages the back portion of the scoop as clearly shown and prevents the same from moving rearwardly within the guide portion and at the same time allows the scoop free vertical movement.

From the foregoing description it will be seen that we have provided a self weighing scoop in which the bowl or scoop proper is so mounted that an exceedingly free vertical movement is obtained in order to allow the weighing scale to weigh correctly without being influenced by the frictional contact and at the same time, means are provided for preventing longitudinal movement in either direction of the bowl, whereby the difficulties now existing in scoops of this character are overcome and a strong weighing scoop is formed which will stand the hard usage to which scoops are often subjected.

Having described our invention and set forth its merits what we claim and desire to secure by Letters Patent is—

1. A self weighing scoop comprising a bowl having inclined sides and curved end, a handle provided with a guide portion conforming in shape to the shape of the bowl, telescoping tubular portions carried respectively by the bowl and guide portion, one of said tubular portions being provided with spaced vertical beads and the other tubular portion with vertical slot, a weighing spring arranged within said tubular portion, and a pointer carried by one of said tubular portions extending through the slot formed in the other tubular portion.

2. A self weighing scoop comprising a bowl, a handle having a guide portion conforming in shape to the shape of the bowl, a transverse bead formed on said guide portion for preventing rearward movement of the bowl therein, telescoping tubular portions carried respectively by the bowl and guide portions, and a weighing spring arranged within said tubular portions.

3. A self weighing scoop comprising a handle having a guide portion provided with an upwardly extending tubular portion, said tubular portion being provided with a slot and graduations, a bowl slidably mounted within said guide portion having a tubular portion extending into the tubular portion of the guide portion, the tubular portion of the scoop being provided with vertical beads for spacing it from the tubular portion of the guide, a weighing spring arranged within said tubular portions, and a pointer carried by the inner tubular portion extending through the slot of the outer tubular portion.

4. A self weighing scoop comprising a bowl, a handle provided with a guide portion conforming in shape to said bowl, means for preventing longitudinal movements of said bowl within said guide portion, tubular telescoping members carried respectively by the bowl and guide portions, means for spacing said tubular members, and a weighing spring arranged within the inner tubular member having its ends connected respectively to the bowl and outer tubular member.

In testimony whereof we affix our signatures in presence of two witnesses.

JULIUS W. MONMONIER.
JOHN HOE MOREHEAD.

Witnesses:
W. C. ROUNDEY,
THOMAS WATTS.

Copies of this patent may be obtained for five cents each, by addressing the "Commissioner of Patents, Washington, D. C."